Nov. 29, 1960     R. L. HAWES     2,961,906
CHIP DEFLECTOR FOR METAL CUTTING MACHINES
Filed Oct. 7, 1957
Fig. 1
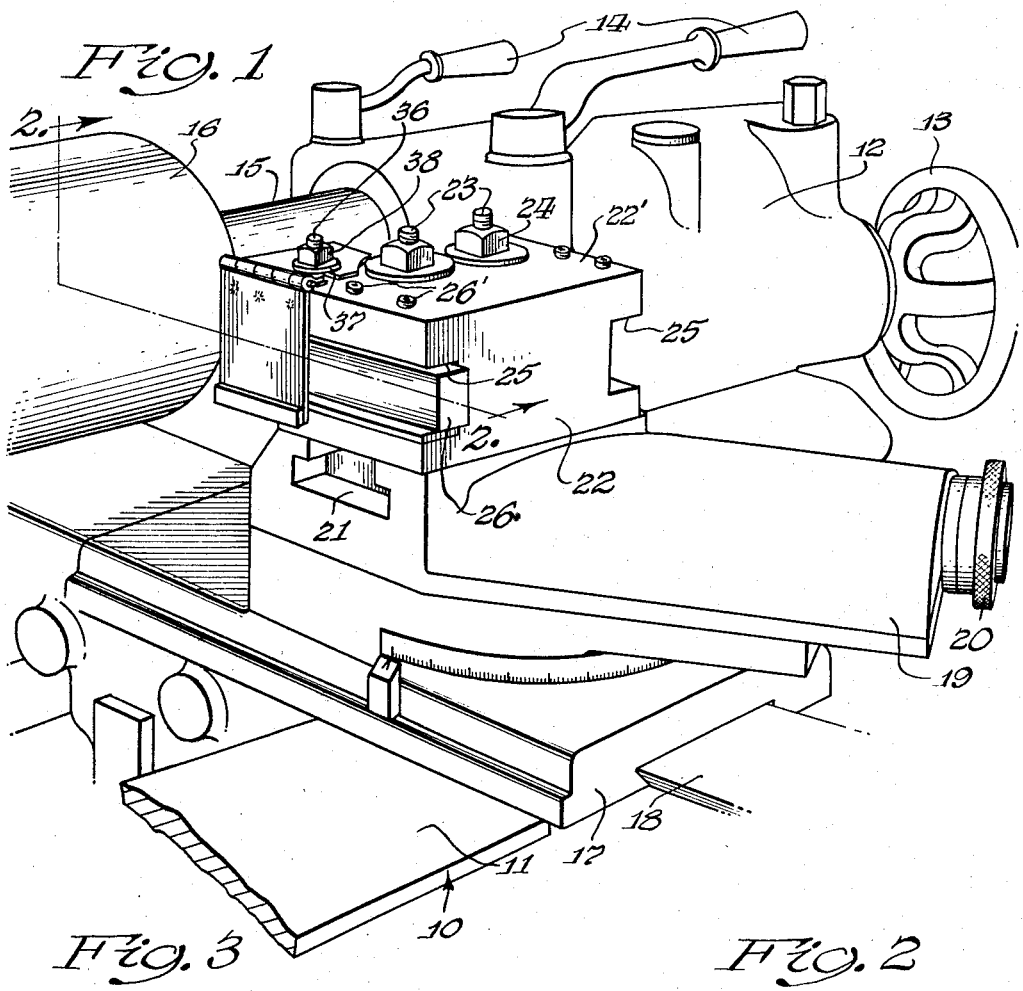
Fig. 3
Fig. 2
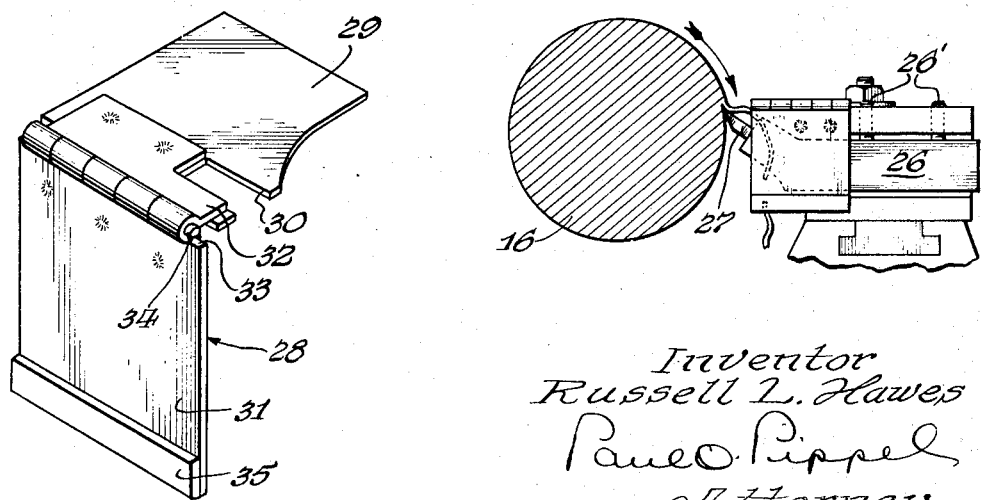
Inventor
Russell L. Hawes
Paul O. Pippel
Attorney

United States Patent Office 2,961,906
Patented Nov. 29, 1960

2,961,906

CHIP DEFLECTOR FOR METAL CUTTING MACHINES

Russell L. Hawes, Cicero, Ill.
(5154 S. 6th Ave., La Grange, Ill.)

Filed Oct. 7, 1957, Ser. No. 688,599

1 Claim. (Cl. 82—34)

This invention relates to a safety device or shield for utilization in connection with metal cutting machines. More specifically the invention relates to a chip deflector particularly adapted for a lathe type of machine tool.

It is a prime object of this invention to provide an improved device for deflecting chips in a direction away from an operator incident to the operation of a lathe.

A further object is to provide an improved chip deflector which can readily be positioned on a lathe type of machine tool adjacent to a cutting tool, the said device being quickly adjustable in position for deflecting chips.

A still further object is the provision of a chip deflector adapted to be positioned adjacent to the cutting tool of a lathe, the deflector permitting the deflection of chips away from the operator of the machine, the said deflector including a hinge deflector flap which permits the metal chips to be deflected and being self-adjustable whereby the pile-up of metal chips is prevented during the cutting operation of the tool.

These and other objects of the invention will become more readily apparent from a reading of the description when examined in connection with the accompanying sheet of drawing.

In the drawing:

Figure 1 is a perspective view of a portion of a lathe having a cutting tool in operating position and including a chip deflector which is connected thereto;

Figure 2 is a enlarged view partly in elevation showing a chip deflector in operating position, the said view being taken substantially along the line 2—2 of Figure 1; and Figure 3 is an enlarged perspective view of the chip deflector shown in Figures 1 and 2.

Referring now particularly to Figure 1, a machine tool of the lathe type is generally referred to by the reference character 10. The lathe 10 comprises a conventional type of slideway or base 11 on which a spindle support 12 is positioned. The spindle support 12 may be longitudinally movable on the slideway or base 11 in a conventional manner. The spindle support 12 comprises a spindle adjustment wheel 13 and suitable lock handles 14 for locking the spindle in position during the operation of the lathe. A spindle 15 projects outwardly from one end of the spindle support 12 and a work piece 16 is rotatably mounted on the spindle. The other end of the lathe is suitably provided with a rotatable chuck (not shown) and the other operating elements of a conventional lathe. A base support 17 is positioned for longitudinal movement on the slideway 11 in conventional fashion. The base support 17 also may be laterally moved with respect to the slideway 11 on a slideway 18. A rotatable support 19 is mounted on the base support 17. The rotatable support 19 includes a suitable adjustment member 20.

The rotatable support 19 also is provided with a T-slot 21 and a tool holder support 22 is firmly positioned on the rotatable support 19. A pair of T-bolts 23 have their lower ends suitably supported within the T-slot 21, the T-bolts 23 extending upwardly above a flat surface 22' of the tool holder support 20. Nuts 24 securely fasten the support 22 to the rotatable support 19.

The tool holder support 22 is provided with oppositely disposed recesses 25. A tool holder designated at 26 is positioned in one of the recesses as best indicated in Figure 1. Set screws 26' securely maintain the tool holder 26 within the recess as best shown in Figure 2. A cutting bit or tool 27 is suitably connected to the front of the tool holder 26 and projects outwardly with respect thereto.

A chip deflector best shown in Figure 2 comprises a bracket 29 having an open end slot 30. A chip deflector or flap 31 is hingedly connected to the bracket 29 by means of hinge sections 32 and 33 hingedly connected together by means of a hinge pin 34. The deflector 28 is provided at its lower end with a weight 35.

As best shown in Figure 1 the chip deflector 28 may be rigidly secured to the flat surface 22' of the tool holder support 22 by means of a bolt 36 which projects upwardly from the surface 22', through the slot 30, and is secured by means of the washer 37 and nut 38. By this arrangement the chip deflector 28 may be moved toward and away from the spindle 15 and work piece 16 as desired.

As indicated, the flap 31 is positioned in substantially parallel relationship with respect to one of the sides of the tool holder 26. The flap 31 is also positioned immediately adjacent the cutting tool 27. In operation, as shown in Figure 2, the work piece 16 is rotated and the cutting bit 27 is in cutting relation with respect to said work piece. The chips fly from the work piece and are deflected, by means of the flap 31, downwardly so that they do not fly toward the operator who is operating the machine. The weight 35 normally keeps the flap 31 in the downwardly hanging position and any pile-up of chips underneath the flap 31 will hingedly move the flap about the hinge pin 34 until the chips drop by gravity beneath the machine. Thus the hinging action of the flap 31 prevents the permanent pile-up of chips which might occur. Such a pile-up of chips ordinarily would necessitate stopping of the machine to remove the chips which might be jammed underneath an immovable shield or guard. In addition a jam of chips underneath an unmovable guard would scratch and mar work piece causing poor finish.

Thus it is apparent that an improved chip deflector has been shown and described and that the objects of the invention have been fully achieved. It must be understood that modifications may be made without departing from the spirit of the invention as disclosed or the scope thereof as defined in the appended claim.

What is claimed is:

For a lathe and the like having a work turning means adapted to turn a work piece about a longitudinal axis, said lathe including a movable tool support having an upper horizontal surface and a vertical side having a recess, a tool holder adjustably secured in said recess, and a cutting tool projecting outwardly from said tool holder and adapted to be placed in cutting relation with respect to said work piece; a chip deflector comprising, a bracket including an open end slot, a fastener extending through said slot into said horizontal surface of said support for adjustably securing said bracket whereby said bracket may be laterally adjusted relative to the axis of said work piece, a flap member, hinge means hingedly connecting said flap member to said bracket whereby said flap member normally assumes a vertical position substantially parallel to the vertical side of said support and overhanging a forward portion of said tool holder, said flap member being hingedly movable about an axis extending generally laterally with respect to said work piece and being positioned in chip deflecting relation to said cutting tool, and a weight connected to an end portion of said flap member for normally urging the same toward said vertical position.

References Cited in the file of this patent

UNITED STATES PATENTS

| | | |
|---|---|---|
| 652,387 | Diehl | June 26, 1900 |
| 1,036,102 | Hartness | Aug. 20, 1912 |
| 2,137,358 | Shaw | Nov. 22, 1938 |
| 2,457,469 | Hillman | Dec. 28, 1948 |

FOREIGN PATENTS

| | | |
|---|---|---|
| 707,551 | Great Britain | Apr. 21, 1954 |
| 546,349 | France | Aug. 18, 1922 |